United States Patent [19]

Kaufmann et al.

[11] Patent Number: 4,507,534
[45] Date of Patent: Mar. 26, 1985

[54] WELDING ROBOT

[75] Inventors: Herbert Kaufmann; Jan Larsson, both of Västerås, Sweden

[73] Assignee: ASEA Aktiebolag, Västerås, Sweden

[21] Appl. No.: 457,477

[22] Filed: Jan. 12, 1983

[30] Foreign Application Priority Data

Jan. 15, 1982 [SE] Sweden ................. 8200203

[51] Int. Cl.³ ............................................ B23K 11/00
[52] U.S. Cl. ................... 219/86.7; 219/86.31; 901/42
[58] Field of Search ............... 219/86.25, 86.31, 86.7, 219/125.1, 86.33; 901/41, 42

[56] References Cited

U.S. PATENT DOCUMENTS 4,310,958  1/1982  Balaud et al. ................. 219/86.7
4,348,575  9/1982  Hedren et al. ................. 219/125.1

FOREIGN PATENT DOCUMENTS 2802884  7/1979  Fed. Rep. of Germany ... 219/86.31

Primary Examiner—Clifford C. Shaw
Attorney, Agent, or Firm—Watson, Cole, Grindle & Watson

[57] ABSTRACT

A handling robot for a current-consuming appliance (e.g. a welding head) comprises a pivotal stand with a first arm which is rotatably journalled in the stand and a second arm which is rotatably journalled in the first arm. The second arm has a sleeve which is journalled in the first arm. In said sleeve, a portion with a holder for the appliance is rotatably journalled. From a transformer, the supply current for the appliance is conducted to a rotatable contact device and to two preferably concentric tubular electrical conductors through the rotatable portion. The tubular conductors are utilized as conduits for cooling water.

5 Claims, 4 Drawing Figures

WELDING ROBOT

TECHNICAL FIELD

The invention relates to a handling robot primarily intended for spot welding. Robots for this purpose normally comprise a stand which is pivotal around a vertical axis. On the stand a first arm is rotatably journalled about a horizontal axis and a second arm is rotatably journalled about a perpendicular horizontal axis in the first arm. The second arm carries a support member for a spot welding gun or the like current-consuming appliance. The support member may comprise units which are themselves rotatable around one or more axes.

DISCUSSION OF PRIOR ART

To effect spot welding, high currents have to be transmitted from a welding transformer to a spot welding gun. Frequently, cooling water, for cooling the welding electrodes, and operating air, for working the appliance, have to be conveyed to and from the spot welding gun. Flexible conductors for the welding current and hoses for the cooling water and operating air have been used on welding robots but in many cases had proved to be unsatisfactory because the repeated flexing or abrasion of exposed parts leads to a reduced working life for these components and hence breakdown and subsequent down time for the robot.

One object of the invention is to locate electrical conductors and conduits for water and operating air in a safe manner in a current-carrying handling robot and to substantially eliminate electric conductors which are subjected to flexure during use of the robot.

A further object of the invention is to increase the working life, and hence the reliability of a current-carrying robot.

BRIEF STATEMENT OF INVENTION

According to the invention, in a robotic welding appliance the welding gun is carried by a unit rotatably journalled in a support arm, in which are arranged electrical conductors for carrying current to the welding gun. In a preferred embodiment, the support arm is tubular and carries the welding transformer and the welding current is conducted from the transformer to the welding gun through conductors within the arm. The support for the welding gun comprises a tubular unit which is rotatably journalled in the support arm, and is thus coaxial therewith. The electrical conductors can be fixedly arranged in this rotatable unit. The tubular unit may at its outer end, support a portion which is rotatable about an axis which is perpendicular to the axis of rotation of the tubular unit. This rotatable portion may include an attachment for a welding gun, which attachment is rotatable about a shaft which is perpendicular to the axis of the carrying portion.

The conductors which carry the welding current from the transformer to the welding gun pass through the rotatable tubular unit in the robot support arm and are conveniently two coaxial, and thus concentric, tubes, one located inside the other. These tubes can thus provide conduits for cooling water. The cooling water can be conducted in one direction in the inner tube and in the opposite direction in the annular space between the tubes. A compressed-air conduit can be located within the inner current conductor tube.

The welding current from the transformer is transmitted to the tube conductors in the rotatable unit in the support arm of the robot and between other relatively rotatable conductor parts via contact devices which are held apart when the relatively rotatable parts move as the robot moves the welding gun from one welding position to the next. The contact devices may comprise annular contact segments which are pressed into contact by compressed-air driven operating devices which are activated simultaneously with the welding gun.

BRIEF DESCRIPTION OF DRAWINGS

The invention will be described in greater detail, by way of example, with reference to the accompanying drawings, in which.

DESCRIPTION OF PREFERRED EMBODIMENT

Figure 1:
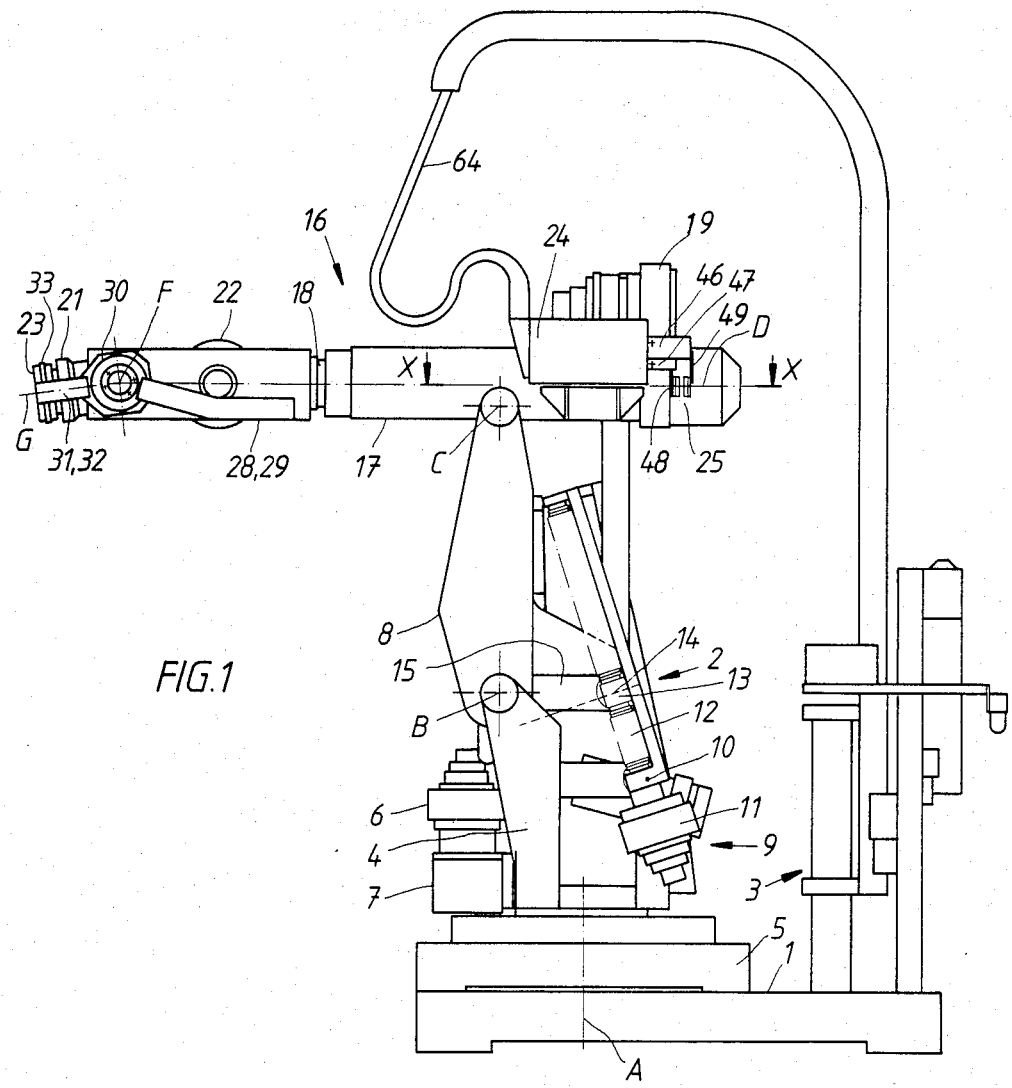
FIG. 1 is a side view of a current-carrying robot, without its current-consuming appliance.

Referring to FIG. 1, 1 designates a transportable base which supports a robot generally designated 2 and a current supply unit generally designated 3. A pivotal stand 4 is rotatably journalled on a bottom plate 5 of the base 1 and is able to turn about a vertical axis A. Oscillating movement of the robot 2 about the axis A is brought about by a motor 6 which is connected, via a gear unit 7 and a drive, to a gear ring which is fixedly connected to the bottom plate 5. A first arm 8 is rotatably journalled about a horizontal axis B in the stand 4 and the arm 8 can be rocked about the axis B by a drive means 9 which is journalled in the stand 4 about an axis 10. The drive means 9 in the illustrated embodiment comprises a motor 11 which drives a screw 12 running in a nut 13 in a ball screw assembly. The ball nut is journalled around a shaft 14 in an arm 15, which is fixedly connected to the first arm 8.

Figure 2:
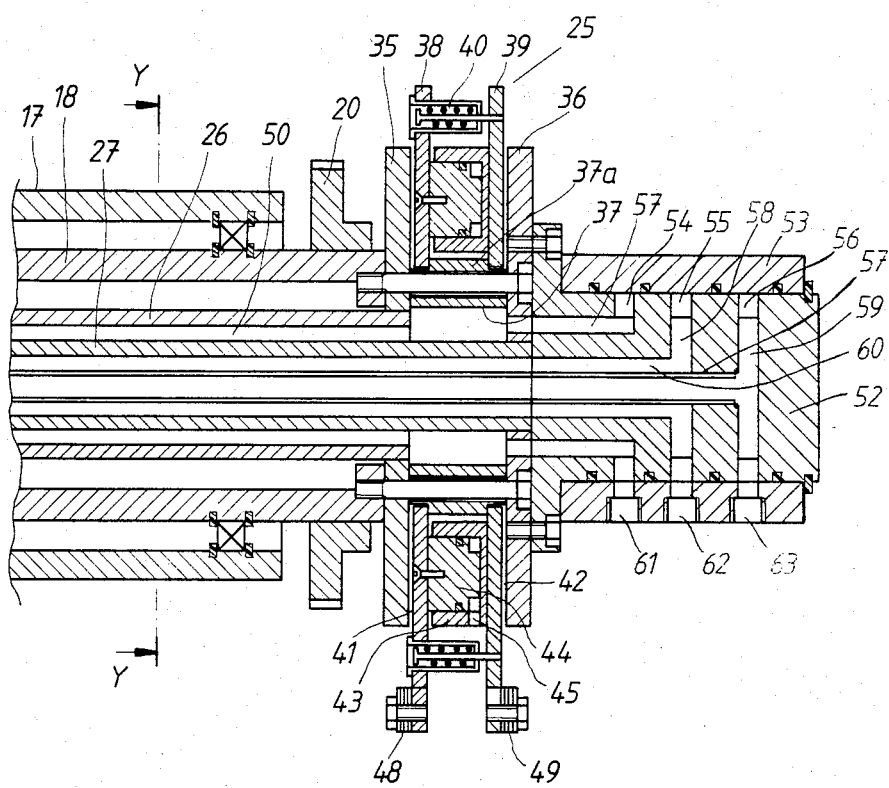
FIG. 2 is a schematic section, on the line X—X in FIG. 1 of part of the support arm of the robot.
Figure 3:
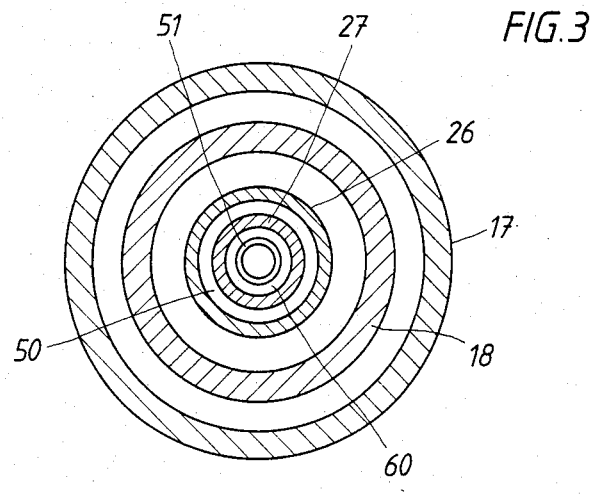
FIG. 3 is a section through the support arm of the robot of FIG. 2, taken on the line Y—Y thereof.

A second arm 16 of the robot 2 is journalled about an axis C at the upper end of the first arm 8. The required movements of the second arm 16 about the axis C are effected by a further drive means (not shown) of the same type as the drive means 9. The second robot arm 16 comprises a tubular sleeve 17 which is journalled in the arm 8 and a tubular portion 18 rotatably journalled about an axis D within the sleeve 17. The tubular portion 18 is driven by a drive means 19 via a gear wheel 20 (see FIG. 2). At the outer end of the tubular portion 18, there is a portion 21 which is rotatably journalled about an axis F and is turned about that axis F by a drive means 22. In the portion 21, an attachment 23 for a spot welding gun (not shown) is rotatably journalled about an axis G. The drive means for the attachment 23 is located inside the portion 21 and thus cannot be seen in FIG. 1.

A welding transformer 24 is mounted on the sleeve 17 of the second arm 16. It is supplied with current from the current supply unit 3 via a flexible cable 64. Current from the welding transformer 24 is conducted to the welding gun through a rotatable contact device 25, concentric conductors 26, 27 (see FIG. 2) and from these to external conductors 28 and 29 (29 being concealed by 28), a further rotatable contact device 30, conductors 31 and 32 (32 being concealed by 31), and a final rotatable contact device 33. The contact devices 30 and 33 are of the same type as the contact device 25, which is shown in more detail in FIG. 2.

The contact device 25 comprises a first annular disk-shaped contact 35, which is electrically and mechanically connected to the tubular conductor 26, and a second annular disk-shaped contact 36 which is electrically and mechanically connected to the tubular conductor 27. Between the conductors 26 and 27, an annular spacer 37 of electrically insulating material is arranged. The contact disks 35 and 36 and the spacer 37 are secured to the rotatably journalled portion 18 of the sleeve 17 and are together driven by the gear wheel 20. Between the contact disks 35 and 36 two axially movable, but otherwise fixed, contact segments 38 and 39 are located. These segments are urged towards each other by a number of springs 40 and are centered, when brought together, by a flange 37a on the spacer 37 so that gaps 41 and 42 are, respectively, created between the disk 35 and the segment 38 and between the disk 36 and the segment 39, thus preventing sliding contact between the confronting disks and segments during rotation of the segments 35 and 36. Between the segments 38 and 39 one or more operating devices are located for overcoming the urging of the springs 40 and pressing the segments 38, 39 against the respective disk 35 and 36. In the embodiment illustrated, the operating device is in the form of an annular cylinder 43 containing a ring piston 44. The operating device 43/44 is activated by compressed air fed through an opening 45. The contact segment 38 and 39 are electrically connected to terminals 46 and 47 of the welding transformer by flexible conductors 48 and 49 of multiple blade type.

The tubular conductors 26 and 27 are also employed for conveying cooling water to and from the welding head. Cooling water can be conducted to the welding gun via the interior of inner tube 27 and led from the gun via the annular space 50 between the tubes, or vice versa. A compressed-air conduit 51 is conveniently located within the inner conductor tube 27. The cooling water and compressed air can be supplied through a swivel connection located to one side of the contact device 25. An inner portion 52 of the swivel connection is fixedly secured to the rotatable portion of the contact device 25. Surrounding the inner portion 52 is a non-rotatable sleeve 53. The inner portion 52 contains three annular grooves 54, 55, 56 and channels 57, 58, 59 which respectively connect the groove 54 with the annular space 50, the groove 55 with a space 60 between the conductor 27 and the compressed-air conduit 51, and the groove 56 with the interior of the compressed-air conduit 51. The sleeve 53 contains connections 61 and 62 for water and a connection 63 for compressed air.

Figure 4:
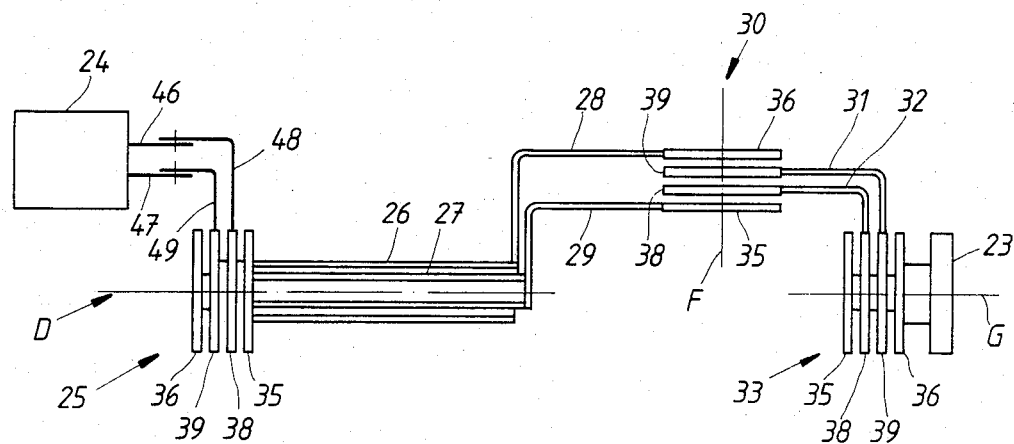
FIG. 4 shows, schematically, the current-carrying conductors used for the welding current.

FIG. 4 shows schematically the arrangement of the welding current conductors between the welding transformer 24 and the attachment 23 for the welding gun. Since the contact devices 30 and 33 are similar to the contact device 25 shown in FIG. 2, they have been shown similar in FIG. 4.

The transformer 24 is connected to the fixed contacts 38 and 39 of the contact device 25 by way of the terminals 46 and 47, respectively, and the flexible conductors 48 and 49, respectively. The rotatable contacts 35 and 36, respectively, of the contact device 25 are connected to the conductor tubes 26 and 27, respectively. The tubes 26 and 27 are connected to the contacts 36 and 35, respectively, of the contact device 30 by way of the conductors 28 and 29, respectively. The contacts 38 and 39 of the contact device 30 are connected to the contacts 38 and 39, respectively, of the contact device 33 by way of flexible conductors 32 and 31, respectively. The contacts 35 and 36 of the contact device 33 are connected to connections (not shown) in the attachment 23 of the spot welding gun.

Although the robot described with reference to the drawings is designed to carry a spot welding gun, it will be appreciated that other welding equipment (and, indeed other current-consuming equipment) could be carried on the attachment 23.

The construction described can be varied in many ways within the scope of the following claims.

What is claimed is:

1. A current-carrying handling robot comprising a base,
   a stand supported on said base so as to turn about a first axis,
   a first arm rotatably journalled on said stand so as to turn thereon about a second axis,
   a second arm rotatably journalled on said first arm so as to turn thereon about a third axis,
   a support member for a current-consuming appliance mounted on said second arm, said support member including a tubular unit which is rotatably journalled to said second arm so as to be rotatable about a fourth axis which extends along the longitudinal dimension of said second arm and is fixed in relation to this arm, said unit having tubular concentric conductors for carrying electrical current to an appliance connected to said support member,
   a welding transformer mounted on said second arm,
   electrical connection means connected between said transformer and said conductors of said unit, said electrical connection means including axially fixed and axially movable contacts rotatable in relation to each other,
   means to press said axially movable contacts against said axially fixed contacts together when current flow thereacross is required, and
   means to separate said axially movable contacts from said axially fixed contacts to allow relative rotary movement therebetween.

2. A robot according to claim 1, wherein said axially fixed contacts are mechanically directly connected to the tubular conductors.

3. A robot according to claim 1, wherein said conductors of said unit are fixedly disposed within said unit.

4. A robot according to claim 1, wherein said second arm is tubular.

5. A robot according to claim 1, wherein means are provided for supplying cooling water between said two concentric tubes.

* * * * *